United States Patent [19]
Jensen

[11] Patent Number: 5,382,769
[45] Date of Patent: Jan. 17, 1995

[54] RESISTANCE BRAZED JOINTS FOR CARBON/CARBON STRUCTURES

[75] Inventor: Jack E. Jensen, San Diego, Calif.

[73] Assignee: Lockheed Corporation, Fort Worth, Tex.

[21] Appl. No.: 503,584

[22] Filed: Apr. 3, 1990

[51] Int. Cl.$^6$ .............................. B23K 31/02
[52] U.S. Cl. .................. 219/85.15; 228/121; 228/262.72; 228/262.9; 219/129
[58] Field of Search .............. 219/118, 86.1, 85.1, 219/85.13, 85.14, 85.15, 85.16, 129; 228/121, 122, 208, 263.12, 262.1, 262.71, 262.72, 262.9

[56] References Cited

U.S. PATENT DOCUMENTS

| | | | |
|---|---|---|---|
| 3,680,201 | 8/1972 | McGregor | 228/177 |
| 3,702,573 | 11/1972 | Nemeth | 76/115 |
| 3,903,585 | 9/1975 | Kosteruk et al. | 228/121 |
| 3,998,632 | 12/1976 | Kosteruk et al. | 420/422 |
| 4,004,173 | 1/1977 | Rigden | 313/317 |
| 4,009,027 | 2/1977 | Naidich et al. | 420/473 |
| 4,343,982 | 8/1982 | Schwartz et al. | 219/118 |
| 4,396,677 | 8/1983 | Intrater et al. | 428/408 |
| 4,396,677 | 8/1983 | Intrater et al. | 428/408 |
| 4,448,853 | 5/1984 | Fischer et al. | 428/607 |
| 4,610,934 | 9/1986 | Boecker et al. | 428/627 |
| 4,650,776 | 3/1987 | Cerceau et al. | 501/96 |
| 4,655,385 | 4/1987 | Suzuki et al. | 228/223 |
| 4,844,323 | 7/1989 | Kondo et al. | 228/121 |
| 4,871,108 | 10/1989 | Boecker et al. | 228/122 |
| 4,907,733 | 3/1990 | Pratt et al. | 228/122 |
| 4,958,364 | 9/1990 | Guerin et al. | 378/144 |
| 5,145,530 | 9/1992 | Cassady | 148/565 |
| 5,161,728 | 11/1992 | Li | 228/124 |
| 5,230,924 | 7/1993 | Li | 427/229 |
| 5,318,214 | 6/1994 | Lucas, Jr. et al. | 228/121 |

*Primary Examiner*—John B. Sotomayor
*Attorney, Agent, or Firm*—Larry J. McQuien; John R. Duncan

[57] ABSTRACT

Carbon/carbon materials are joined together by the placement of a brazing alloy between the materials to be joined applying a clamping pressure and passing an electric current through the parts and brazing alloy until the brazing-k15H alloy melts and when allowed to solidify forms a unitary structure from the parts.

3 Claims, 1 Drawing Sheet

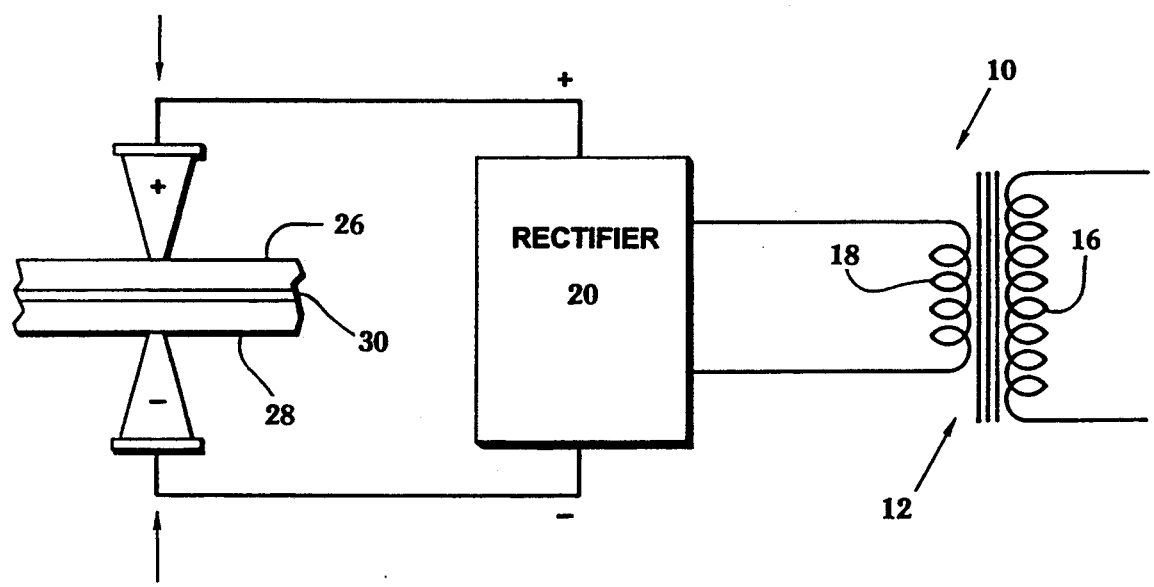

RESISTANCE BRAZED JOINTS FOR CARBON/CARBON STRUCTURES

BACKGROUND OF THE INVENTION

The invention is directed to the joining of carbon/carbon parts and more particulary to the joining of carbon/carbon parts by braze bonding the parts together with a brazing alloy.

One of the most pressing challenges in the development of refractory composite material as a structural material for high temperature aerospace application, is the joining and fastening of the various airframe elements.

Attempts have been made to use threaded fasteners for this purpose. A major problem involved in the use of threaded fastening members is that of oxidation and breakdown of oxidation resistant containers. Another problem is the fracturing or other damage to the materials to be joined by the fastener being tensioned.

Furnace brazing of carbon/carbon parts has satisfactorily been accomplished; However, due to the limited size of high temperature processing furnaces, only small parts can be fabricated.

Until the emergence of the present invention there has not been an entirely satisfactory method or means for braze bonding together parts to form large carbon/carbon assemblies.

SUMMARY OF THE INVENTION

The present invention is directed to the joining together into a unitary structure carbon/carbon parts regardless of their physical size by means of the placement of a braze material between the parts to be joined and locally simultaneously applying heat and pressure by means of a resistance welding machine whereby the carbon/carbon parts and braze alloy are heated to an elevated temperature wherein the braze material melts and re-solidifies when the current is removed. By placement of adjacent resistance welds by moving of the parts through the resistance welder a single unitary braze bonded structure is produced. The brazing material must be refractory and ductile and in a foil form. Brazing alloys of vanadium or zirconium can be employed for this purpose.

The carbon/carbon parts to be joined are stacked and held together by any conventional mechanical means with a layer of brazing alloy positioned therebetween. The stacked material is then simultaneously subjected to pressure and current passing therethrough until the alloy melts. The current is then removed wherein the braze material re-solidifies bonding together the carbon/carbon parts. The current is provided, for example, by a conventional resistance welder well known in the art and described generally in U.S. Pat. No. 4,343,982 assigned to Energy Development Associates, Inc.

An object of this invention is to provide a method of bonding together parts to form carbon/carbon structural assemblies.

Another object of this invention is to provide a method of bonding together carbon/carbon parts by braze bonding.

Still another object of this invention is to provide a method to bond together large parts of carbon/carbon material by passing a current from a resistance welder through the parts and a brazing alloy positioned therebetween causing the brazing alloy to melt and when allowed to solidify braze bonds together the parts.

These and other objects and advantages of the present invention will become apparent to those skilled in the art after considering the following detailed specification in which the preferred embodiment are described in conjunction with the accompanying drawing Figures.

BRIEF DESCRIPTION OF THE DRAWING FIGURE

The figure depicts a schematic cutaway showing of the placement of the parts and brazing alloy relative to the resistance welder supplying the clamping pressure and heating current.

DETAILED DESCRIPTION OF THE PREFERRED EMBODIMENT

Referring now to the drawing Figure, a resistance welder 10 is shown having a transformer 12 with a primary winding 16 and a secondary winding 18. The primary is connected to a source of high voltage and high current alternating source and the secondary is connected to a rectifying circuit 20 having an direct current positive and negative output. These outputs are connected to a positive and negative electrode 22 and 24 respectfully. Electrodes 23 and 24 are mechanically loaded so as to apply a simultaneous clamping pressure to the parts being resistance brazed. Positioned and clamped between the electrodes are the carbon/carbon parts 26 and 28 to be joined. Sandwiched between the parts 26 and 28 is a braze alloy 30 that when a current is passed therethrough by for example, a resistance welder, causes the braze material to melt and when the current is removed re-solidifies bonding the parts together into a unitary structure. The process is repeated along the length of the joined edges to produce multiple resistance braze bonds at the desired spacing. The brazing alloy can be an alloy as described in U.S. Pat. No. 4,000,026 or and other suitable braze alloy which is in the form of a foil for example, vanadium or zirconium. The alloy must have a melting point higher than the use temperature and must be ductile and bond together the carbon/carbon parts.

In practice, the carbon/carbon parts are held in close proximately by any convenient mechanical method as by way of example and not by way of limitation, clamps, setup bolts, etc. A layer of braze material in the form of a thin foil is deposited between the carbon/carbon parts. The parts with the braze material in place are then positioned between the + and − electrodes of the resistance welder in the general location of the proposed bond. The welder is then energized to clamp the parts with a known pressure and cause current to flow through the parts and braze material. As the current flows the temperature of the parts are elevated to a level causing the braze material to melt. The current is then removed and the braze alloy again solidifies bonding together the carbon/carbon parts. Additional similar braze bonding operations may be preformed along the juncture of the parts as determined by the use requirements of the joined parts. After the brazing operation on given parts is completed the mechanical holding means is removed and the now joined together carbon/carbon parts are ready for ultimate use or the next step in preparation for eventual use.

While there have been shown and described preferred steps of resistance braze bonding of carbon/carbon parts to form a unitary structure in accordance with the invention, it will be appreciated that many changes and modifications may be made therein without, however, departing from the essential spirit thereof.

What is claimed is:

1. A method of resistance braze bonding carbon/carbon parts together to form a unitary structure comprising the steps of:

providing parts consisting essentially of carbon/carbon material;

placing a foil of a metal selected from the group selected from zirconium, vanadium and mixtures thereof between the surfaces of said carbon/carbon parts to be bonded together;

clamping said carbon/carbon parts together under pressure with said foil therebetween;

passing electrical current between said parts and through said foil whereby said parts and foil are resistance heated to the melting temperature of said foil; and terminating said electrical current and allowing said molten foil harden;

whereby said carbon/carbon parts are brazed together.

2. The method as defined in claim 1 wherein said electrical current and said clamping force is provided by welder electrodes.

3. The method according to claim 1 wherein said parts have an elongated interface, an elongated strip of said foil is placed between said parts along said elongated interface and said clamping and resistance heating steps are repeated a plurality of times at spaced points along said elongated interface.

* * * * *